(12) United States Patent
Rowe

(10) Patent No.: US 6,484,868 B1
(45) Date of Patent: Nov. 26, 2002

(54) OVERHEAD MATTRESS STORAGE AND SORTING CONVEYOR

(76) Inventor: James R. Rowe, P.O. Box 5347, Huntington, WV (US) 25703

( * ) Notice: Subject to any disclaimer, the term of this patent is extended or adjusted under 35 U.S.C. 154(b) by 0 days.

(21) Appl. No.: 09/514,028

(22) Filed: Feb. 25, 2000

Related U.S. Application Data

(60) Provisional application No. 60/121,553, filed on Feb. 25, 1999.

(51) Int. Cl.⁷ .............................................. B65G 37/00
(52) U.S. Cl. .................................... 198/580; 198/347.1
(58) Field of Search ............................... 98/347.1, 580, 98/587, 812, 797

(56) References Cited

U.S. PATENT DOCUMENTS

| | | | |
|---|---|---|---|
| 2,576,217 A | 11/1951 | Eggleston | 198/139 |
| 2,767,865 A | 10/1956 | Lasater et al. | 214/40 |
| 2,795,312 A | 6/1957 | Howdle | 198/31 |
| 2,812,848 A | 11/1957 | Yaggi | 198/139 |
| 2,851,153 A | 9/1958 | Carlson | 198/208 |
| 3,596,785 A | 8/1971 | Weatherford, Jr. | 214/89 |
| 3,612,249 A | 10/1971 | Schneider | 198/38 |
| 3,819,068 A | 6/1974 | Weir | 214/38 |
| 3,825,107 A | 7/1974 | Cary et al. | 198/139 |
| 3,836,021 A | 9/1974 | McWilliams | 214/41 |
| 3,993,204 A | 11/1976 | Hummel | 214/89 |
| 4,011,935 A | 3/1977 | Massey | 198/365 |
| 4,130,193 A | 12/1978 | Bourgeois | 198/369 |
| 4,166,525 A | 9/1979 | Bruno | 198/437 |
| 4,281,756 A | 8/1981 | Bruno | 198/356 |
| 4,300,366 A | * 11/1981 | Barrett | 198/580 |
| 4,549,647 A | 10/1985 | Cossé | 198/461 |
| 4,787,803 A | 11/1988 | van Elten et al. | 414/218 |
| 4,896,764 A | 1/1990 | Neunzert | 198/812 |
| 4,934,507 A | * 6/1990 | Blocker | 198/580 X |
| 4,946,027 A | 8/1990 | Jenkins | 198/592 |
| 5,009,560 A | 4/1991 | Ruder et al. | 414/392 |
| 5,307,917 A | 5/1994 | Hall | 198/313 |
| 5,351,809 A | 10/1994 | Gilmore et al. | 198/812 |
| 5,383,760 A | 1/1995 | Cawley et al. | 414/794.7 |
| 5,403,142 A | 4/1995 | Stewart | 414/392 |
| 5,429,223 A | 7/1995 | Moeller | 198/369.1 |
| 5,487,462 A | 1/1996 | Gilmore | 198/594 |
| 5,490,592 A | 2/1996 | Best et al. | 198/812 |
| 5,640,833 A | 6/1997 | Gerber | 53/443 |
| 5,671,837 A | 9/1997 | Tazou et al. | 198/369.2 |
| 5,685,416 A | 11/1997 | Bonnet | 198/812 |

* cited by examiner

Primary Examiner—James R. Bidwell
(74) Attorney, Agent, or Firm—Frost Brown Todd LLC

(57) ABSTRACT

A mattress storage and sorting conveyor, which discharges to one or more extendable conveyors, has a feed section that collects the mattress from one or more wrappers and inserts the mattress onto a circulating system which stores the mattresses until ready to be transferred. A short length of the circulating system may be repositioned to discharge a particular mattress to one or more conveyors that transport the mattress to a respective extendable conveyor. An operator at a control station selects which mattress to discharge from the circulating system. The conveyor system is controlled by a series of sensors, relays, and motor controllers to prevent or minimize the collisions between mattresses on the circulating system of the conveyor.

11 Claims, 5 Drawing Sheets

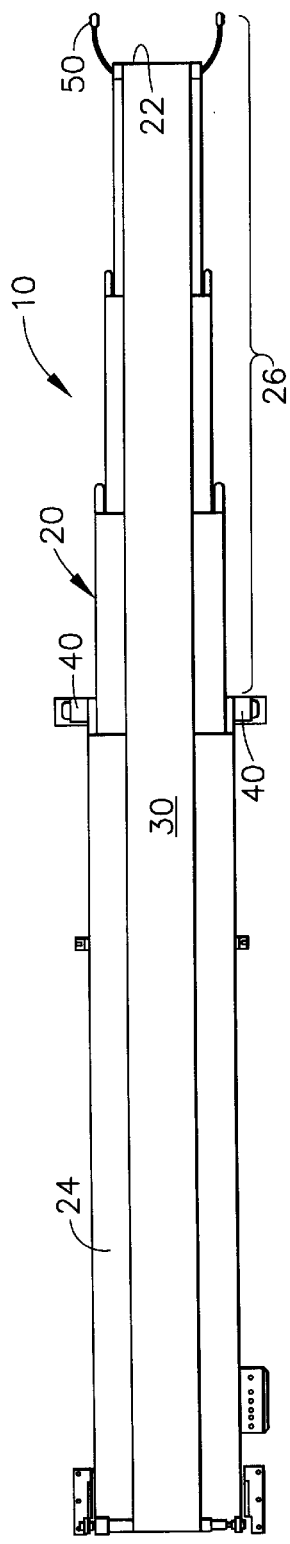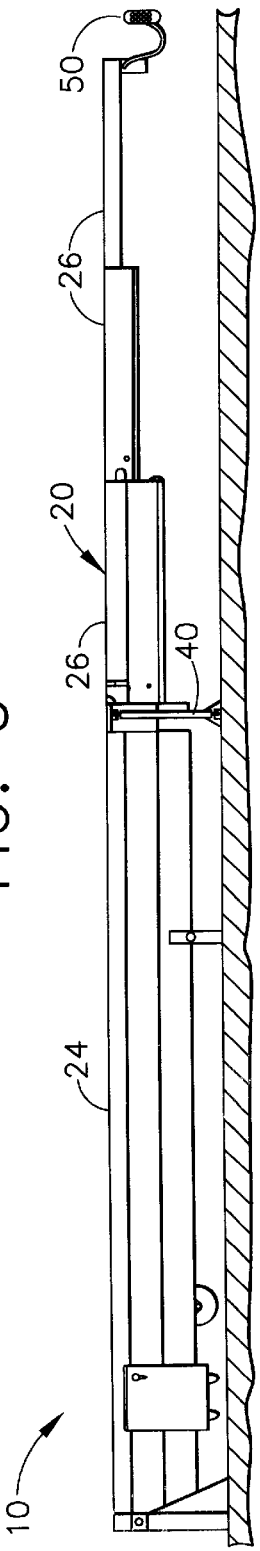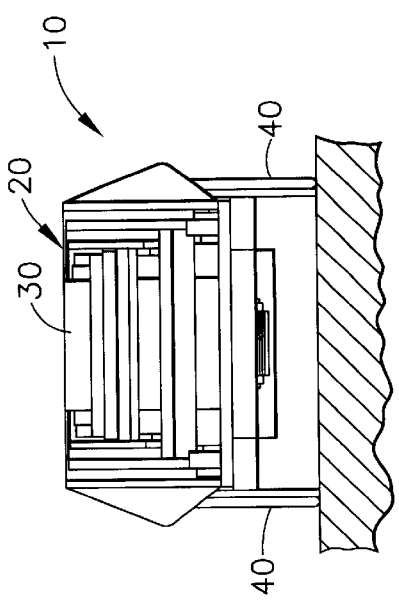
FIG. 3
FIG. 4
FIG. 5

OVERHEAD MATTRESS STORAGE AND SORTING CONVEYOR

This application claims priority of U.S. Provisional Patent Application, Ser. No. 60/121,553, filed on Feb. 25, 1999, the disclosure of which is incorporated herein by reference.

TECHNICAL FIELD

This invention relates generally to conveyors and other devices used to load heavy and/or awkward loads into trucks, and more particularly to conveyors that are used to store, sort, and load heavy and/or awkward objects such as mattresses into trucks, containers, or other confined areas.

BACKGROUND OF THE INVENTION

Conveyors and the like, together with manpower have long been used to load trucks and move packages within a manufacturing facility. The use of many people to move objects within a plant or to load a truck with heavy and/or awkward objects is becoming less and less attractive as the cost of wages increase. In addition to the labor costs, there are costs associated with on the job injuries. These costs include both the costs of workers' compensation insurance and the costs associated with loss of the injured individual's labor for a period of time while the injury heals. During the period of time when a person is absent from work due to an injury, not only may the employer have to pay the absent worker, but the employer may also have to pay the wages of a replacement worker who may be unfamiliar with the employer's operations.

Moving or loading of heavy and/or awkward items raises the risks substantially of the worker being injured. While the use of conventional methods can prevent many injuries, these tools are not effective for all types of cargo. For example, a large king size mattress can weigh as much as two hundred pounds and have dimensions exceeding six feet long, six feet wide, and fourteen inches high. Modern mattresses are both heavy and awkward for one person to carry and/or move by hand or with a dolly and are awkward to move from the machine that wraps the mattress in plastic to the truck.

Typically, a mattress is manufactured, wrapped, and shipped in the same day to ensure that the customer receives a "fresh" mattress. Thus, to save time and to ease the unloading process, mattresses are often manufactured in the order that they will be loaded in the truck or shipping container. Often, due to order changes or errors on the assembly line one or more mattresses may be manufactured out of the loading sequence. These out of sequence mattresses are typically piled in an area that is out of the way. When it is time to load one of the mattresses in the stack, the stack is disassembled, the selected mattress removed, and the other mattresses that are not yet required are re-stacked. This stacking, unstacking, sorting, and re-stacking takes time and reduce the number of mattresses that can be loaded in a day.

Therefore, a storage and sorting conveyor system that discharges to an extendable conveyor is needed that will enable a mattress manufacturer to collect mattresses quickly and easily from one or more wrappers, store, sort, and discharge mattresses, box springs, and/or other heavy and awkward packages to an extendable loading conveyor while minimizing the risk of injury to the worker. The extendable loading conveyor enables the mattresses to be loaded into trucks, containers, or other limited areas without the workers having to support the weight of the mattress.

SUMMARY OF THE INVENTION

The present invention has solved the package handling problems cited above and generally comprises a mattress storage and sorting conveyor that discharges to one or more extendable conveyors. The storage and sorting conveyor has a feed section that collects the mattress from one or more wrappers and inserts the mattress onto a circulating system which stores the mattresses until ready to be transferred elsewhere. Typically, this circulating system is located overhead to minimize the loss of floor space, although the circulating system may be located at any convenient location. A short length of the circulating system typically is repositioned to discharge a particular mattress to one or more conveyors that transport the mattress to a respective extendable conveyor. An operator at a control station selects which mattress to discharge from the circulating system. The conveyor system is controlled by a series of sensors, relays, and motor controllers to prevent or minimize the collisions between mattresses on the circulating system of the conveyor.

The extendable conveyor is a modification of existing extendable conveyors. The modifications enable the discharge end of the conveyor to move from a loading position near the top of the truck to a loading position near the bottom of the truck through out the length of the truck. This range of movement is greater than the range of movement that is typically employed in extendable conveyors and enables mattresses and other cargo to be loaded into a truck without the worker having to lift and/or catch the mattress or package. Additionally there may be provided dual control boxes at the discharge end of the conveyor to enable the conveyor to be controlled from either side depending on the worker's preference and/or best location for observing and controlling the loading procedure.

An object of the present invention is to provide a mattress conveyor system for storing, sorting, and discharging mattresses to extendable conveyor that will permit a truck to be loaded with mattresses without a worker having to lift and/or catch a heavy mattress.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

BRIEF DESCRIPTION OF THE DRAWINGS

The accompanying drawings incorporated in and forming part of the specification illustrate several aspects of the present invention, and together with the description serve to explain the principals of the invention. In the drawings:

FIG. 3 is a top view of the extendable mattress conveyor in accordance with the present invention.

FIG. 4 is a side view of the extendable conveyor shown in FIG. 3.

FIG. 5 is a front view of the extendable conveyor shown in FIG. 3.

Reference will be made in detail will be made in detail to the present preferred embodiment of the invention, as an example of which is illustrated in accompanying drawings.

DESCRIPTION OF AN EMBODIMENT

The mattress storage and sorting conveyor provides a system that permits warehouse workers to easily and safely sort and load large and awkward packages such as mattresses into a truck, container, or other confined area. Thus the warehouse owner, and other employers, will have improved productivity through faster loading and fewer injuries to their employees and consequently lower workers' compensation insurance rates.

Storage and Sorting Conveyor

Figure 1A:
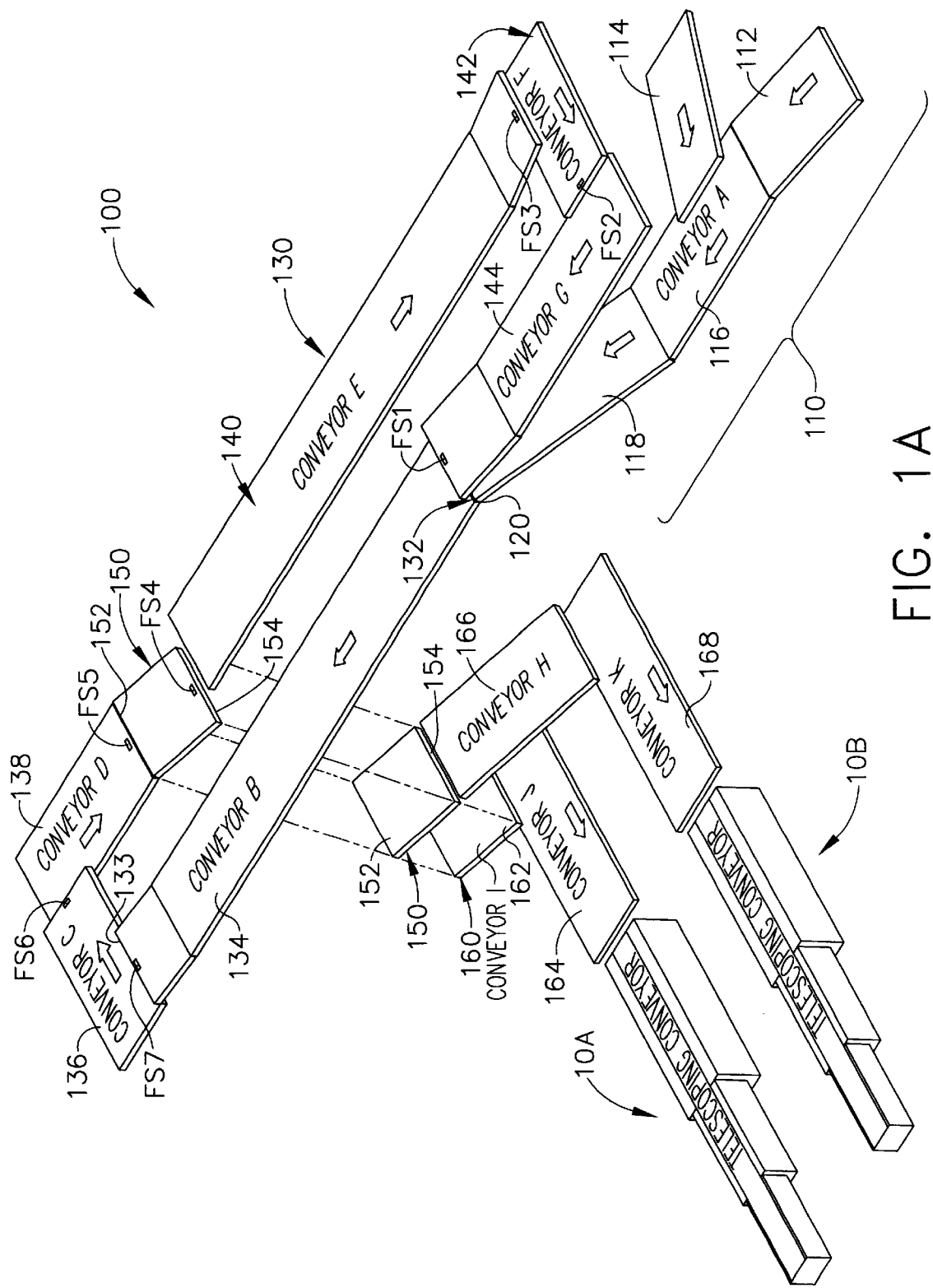
FIG. 1A is a schematic illustration of the mattress storing and sorting conveyor in accordance with the present invention that discharges to an extendable conveyor.
Figure 1B:
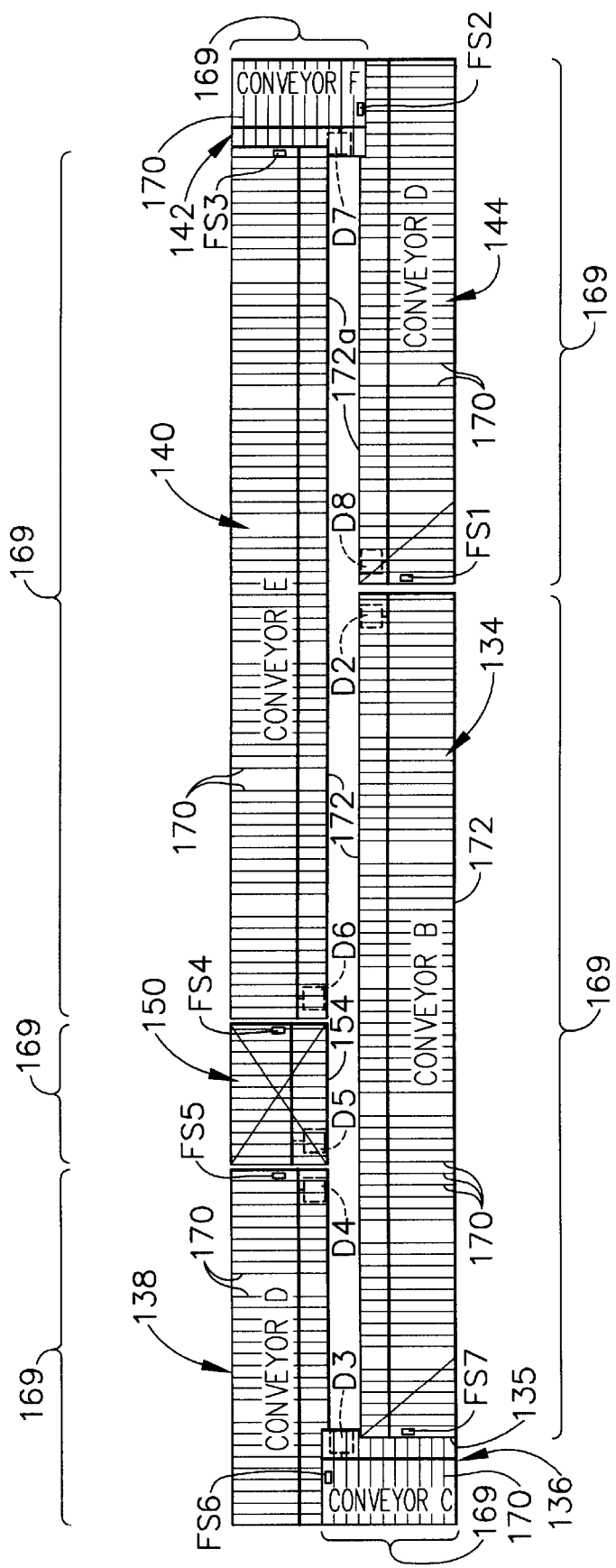
FIG. 1B is a diagrammatic representation of the overhead mattress circulating system utilized in the mattress storing and sorting conveyor illustrated in FIG. 1A.
Figure 1D:
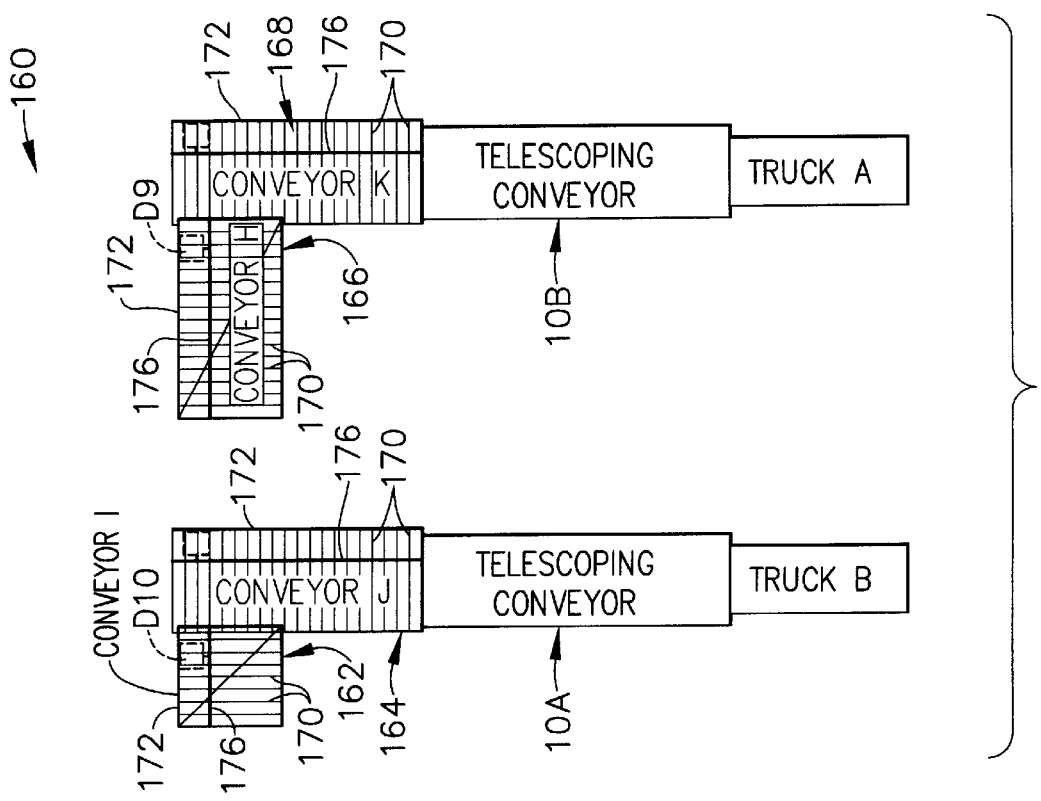
FIG. 1D is a diagrammatic representation of the discharge system utilized in the mattress storing and sorting conveyor illustrated in FIG. 1A.
Figure 1C:
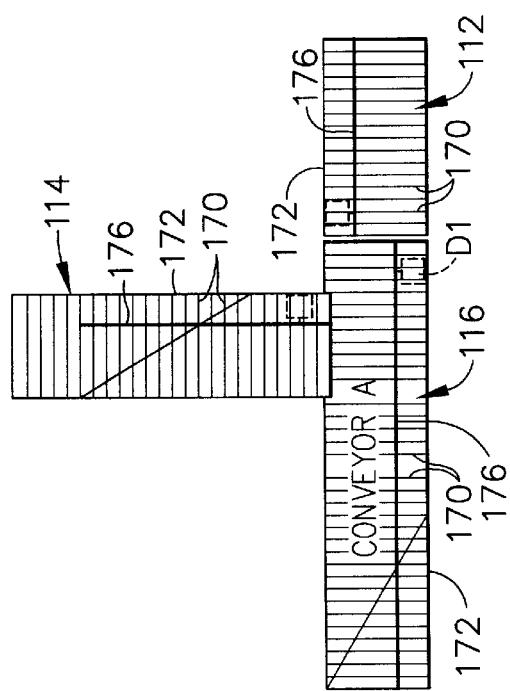
FIG. 1C is a diagrammatic representation of the feeder system utilized in the mattress storing and sorting conveyor illustrated in FIG. 1A.

Referring now to the drawings in detail wherein like numerals indicate the same elements throughout the views, FIG. 1A provides a schematic illustration of the mattress storage and sorting conveyor 100. FIGS. 1B–1D provide diagrammatic representations of the individual systems the are utilized to form the mattress storage and sorting conveyor 100. This conveyor system has a feed section 110 which collects the mattress from one or more wrappers (not shown) and delivers them to the circulating system 130. Typically, circulating system 130 is located overhead in the mattress manufacturing facility in order to minimize the loss of floor space. The actual location and orientation of feeder 110 depends on a particular plant's configuration. Typically, space in the plant is constrained, thus feeder 110 is shown located underneath a portion of the circulating system 130 and inserts a mattress through a gap between two conveyor sections 169 of the circulating system 130. Alternatively, feeder 110 could be located such that the mattress would be placed directly on to the circulating system 130. Other feeder orientations or arrangements include overhead or from the side.

Gap 132 is of the appropriate size and shape to permit the largest mattress manufactured at the facility to move through gap 132 without catching or hanging up on the support structure or conveyor sections 169 that form circulating section 130. A discharge section 150 serves as one of the conveyor sections 169 that form the circulating system 130. The discharge section 150 permits an operator to selectively discharge and/or remove a particular mattress from the circulating system 130. As discussed below, discharge section 150 selectively directs the mattress being discharged from circulating system 130 to discharge loading conveyor system 160. Discharge loading conveyor system 160, as described below, typically delivers the mattress to the appropriate extendable conveyor 10 utilized to load the mattress into a particular truck or shipping container.

Feeder Section

Feeder section 110 collects the mattress as it is discharged from a wrapper (not shown) on entrance section 112 or 114 if a second wrapper is used. Preferably the second wrapper is arranged parallel to the first wrapper so that all the mattresses move along feeder section 110 with the same orientation. Alternatively, entrance section 112 or 114 may deliver the mattress from some other point in the manufacturing plant. Typically, the mattress is placed on the entrance section 112 or 114 so that the long axis of the mattress is approximately aligned with the direction of motion of conveyor-A section 116. Conveyor-A section 116 conveys the mattress from either entrance section 112 or 114 to an insert section 118. Preferably insert section 118 will lift the mattress from the floor level of the production facility to the overhead where the circulating system 130 is preferably located. If the circulating system 130 is located in the same level as the feeder section 110, then the insert section 118 would only have to lift the mattress high enough to deposit the mattress on the circulating system 130. Alternatively as previously mentioned, the mattress may be deposited from above or the side. The discharge end 120 of insert section 118 is located to insert the mattress through gap 132 in the circulating system 130.

Circulating System

In one embodiment, circulating system 130 may be assembled from seven conveyor sections arranged in a square or rectangular shape, although other suitable configurations may be used. The use of a square/rectangular shape for circulating system 130 maintains the mattress orientation throughout the circulating system 130 and eliminates the need to use large radius corners. Alternatively, round corners could be employed, however, the use of large radius corners may raise the cost of the circulating system 130. Typically, mattresses will be inserted into circulating system 130 along one of the long sides of the circulating system 130 and discharged from discharge section 150 located in the opposite long side or at another suitable location. Preferably, the mattresses will be conveyed in such a manner that when carried on extendable conveyor 10 that the long side of the mattress would lie across the extendable conveyor 10. This orientation of the mattress permits easier and faster loading of the mattress and maximizes the number of mattresses that can be loaded into a given truck and/or container.

The circulating system 130 of the mattress storage and sorting system 100 is preferably made up of several individual conveyor sections 169. A single conveyor, such as a live roller conveyor, with individually controllable zones may also be used Each conveyor section 169 typically is formed from a plurality of rollers 170 that are carried by a frame 172 as is common in the conveyor industry. Additionally, each conveyor section 169 has its own drive motor DX (X representing the motor number). Preferably, the drive motor DX is an electric motor that permits control of the conveyor system through use of electronic switches and relays.

The motor for a particular conveyor section will drive a relatively narrow belt 176. Preferably, the belt 176 is located approximately 25% of the conveyor's width from the inner frame 172a. This belt location tends to permit a small vertical distance between the overlapped conveyors and still prevent the mattress from contacting the belt 176 until the mattress clears the end of a the upstream overlapped section. While the 25% distance from the inside edge of the conveyor is preferred other locations could easily be utilized by adjusting the overlap height. Preferably, belt 176 is approximately 4 to 12 inches in width. The width of rollers 170 preferably would exceed the maximum width of the largest mattress to be carried on the conveyor. The narrow belt 176 runs over top the rollers 170. Preferably, the end of each conveyor section of circulating system 130 where the mattress changes direction has the discharged end raised and slightly overlapping the downstream conveyor section. The height of the discharge end of a particular conveyor section is set so that the mattress will not contact belt 176 of the downstream conveyor until the mattress has cleared the discharge end of the upstream conveyor. Thus, when a mattress is discharged from one conveyor section on to another, the mattress will not start to transit along the downstream conveyor section until the entire mattress is on the downstream conveyor section with the mattress in contact with belt 176. However, once the center of mass has passed the downstream end of the upstream conveyor, and subject to its vertical velocity, and the acceleration of gravity, the mattress tips down and slides on rollers 170 of the downstream conveyor until the mattress clears the end of the upstream conveyor. The direction of motion changes when the mattress makes contact with the belt 176. Of course, other conveyor configurations suitable for transferring mattresses to a downstream conveyor may alternatively be used, such as coordinated action between a conveyor with a discharge end at the same level with the downstream conveyor.

Typically, circulating system 130 is made up of several conveyor sections 169. There is conveyor-B section 134 which carries the mattress from insert section 118 to conveyor-C section 136. Preferably, the discharge end of conveyor-B section 134 is raised above conveyor-C section 136. Conveyor-C 136 serves to change the motion direction of the mattress without changing its orientation. Conveyor-C section 136 directs the mattress to conveyor-D section 138 which carries the mattress in the opposite direction as conveyor-B section 134. Typically, the discharge end of conveyor-C also overlaps Conveyor-D section 138. Conveyor-D section 138 discharges the mattress to discharge section 150.

In the preferred embodiment, discharge section 150 pivots on hinge 152 to lower discharge end 154 to direct the mattress to the discharge conveyor system 160 which directs the mattress to one of the extendable conveyors 10 and thence into the truck or other container. When it is not desired to discharge a mattress, discharge end 154 will be in the raised position and will direct the mattress to conveyor-E section 140 which delivers the mattress to conveyor-F section 142. Preferably, the discharge end of conveyor-E section 140 is raised above and overlaps conveyor-F section 142 since conveyor-F section 142 changes the motion direction of the mattress. Conveyor-F section 142 carries the mattress to conveyor-G section 144. Typically, the discharge end of conveyor-F is raised above and slightly overlaps conveyor-G section 144 where the mattress changes direction again.

When the mattress is transiting along conveyor-G section 144 the mattress preferably returns to the same motion direction as conveyor-B section 134. Conveyor-G section 144 will deliver the mattress across gap 132 to conveyer-B section 134. Thus, a mattress may trace a closed path using the conveyer sections described above. By leaving mattresses in the circulating system 130 a number of mattress may be stored until it is the proper time to discharge the mattress to the discharge conveyor system 160. The typical arrangement for conveyor sections 169 that form circulating system 130 is a square or rectangle, however, any closed loop could also easily be utilized.

Discharge System

When it is desirable to load a particular mattress into a truck or container and that mattress will be the next mattress to enter discharge section 150, the operator pivots discharge section 150 and directs the mattress to conveyor-H section 166 or conveyor-I section 162. Alternatively, discharge section 150 may be lowered once the mattress is on discharge section 150. Conveyor sections 162 and 166 direct the particular mattress to conveyors section 164 or conveyor-K section 168 that respectively, will carry the mattress to the extendable conveyor 10 serving the truck into which the mattress is to be loaded.

Conveyor-I section 162 directs the mattress to conveyors section 164 that carries the mattress to the first extendable conveyor 10A. Conveyor-H section 166 discharges the mattress on conveyor-K section 168 that deposits the mattress on the second extendable conveyor 10B. Preferably, conveyor section 166 and 168 place the mattress on the extendable conveyor 10 with the long side of the mattress lying across the extendable conveyor 10. This mattress orientation seems to provide for the most efficient loading of the truck or container.

While the particular conveyor system described above is the preferred embodiment with the feeder section 110 feeding the mattress from one or more wrappers (not shown) to an overhead circulating system 130 which will direct a particular mattress at a desired time to the discharge section 160 and thence into the particular truck and/or container. Other embodiments where the circulating system 130 was not raised above the level of feeder section 110 or extendable conveyor 10 are possible and would be obvious in light of the above teachings.

Conveyor Control System

Figure 2:
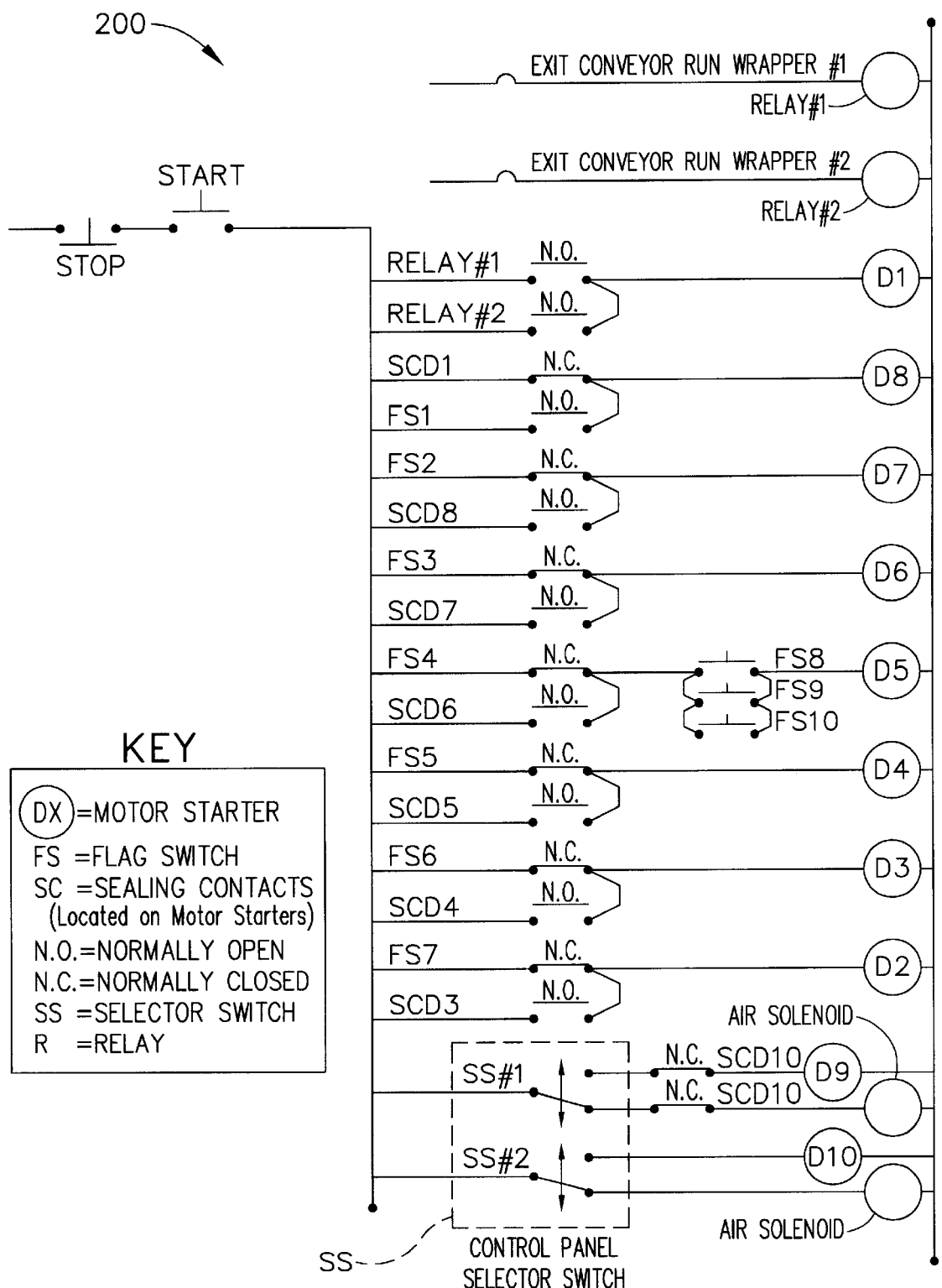
FIG. 2 is an electrical schematic of the conveyor control system.

The conveyor control system 200 illustrated in FIG. 2 utilizes a number of flag switches FSX (X designating the number of a particular flag switch) to control the operation of the circulating system 130. Typically there is a flag switch FSX located at the discharge end of each conveyor section 169 that forms a part of the circulating system 130. These flag switches FSX and the control system 200 are designed to prevent or minimize the number of collisions between mattresses. The control system utilizes flag switches FSX to detect the presence of a mattress. Additionally, sealing contacts SCDX (X designating the motor number of a particular sealing contact) located on motor starters DX are utilize in parallel with the contacts from the flag switch FSX so that if a downstream conveyor section is running, then the upstream conveyor system would continue running even if a mattress was detected.

Typically, when the operator starts the circulating system 130 motors D2 through D8 energize. When motor starters D2 through D8 energize all conveyor sections 169 in the circulating system 130 typically start. Motors D2 through D8 will continue to operate until shut down by the control system 200.

When the exit conveyor on either wrapper energizes it starts conveyor-A section 116 and opens sealing contact SCD1 to stop motor D8 located in conveyor-G section 144 unless a mattress has triggered flag switch FS1. If a mattress is being detected by flag switch FS1, then motor D8 will continue to run until the mattress has cleared flag switch FS1. Once the mattress clears flag switch FS1 the motor D8 for conveyor-G section 144 shuts down until the exit conveyor on both wrappers is de-energized. Typically, the time required for a mattress to move from the wrapper to gap 132 is sufficient for a mattress triggering flag switch FS1 to clear flag switch FS1.

When flag switch FS2 located at the discharge end of conveyor-F section 142 detects a mattress, drive motor D7 stops unless drive motor D8 which serves conveyor-G section 144 (the downstream section) is energized. Thus, conveyor-F section 142 will not discharge a mattress onto the downstream conveyor section-G section 144 unless drive motor D8 is energized.

Similarly, flag switch FS3 located at the discharge end of conveyor-E section 140 will deenergize drive motor D6 which powers conveyor-E section 140 when flag switch FS3 detects a mattress unless the drive motor D7 for the downstream conveyor section-F section 142 is energized. Flag switch FS4 deenergizes motor D5 located in discharge section 150 unless drive motor D6 is energized. Like wise flag switch FS5 stops drive motor D4 located in conveyor-D section 138 unless drive motor D5 is energized; flag switch FS6 stops drive motor D3 located in conveyor-C section 136 unless drive motor D4 is energized; and flag switch FS7 stops drive motor D2 located in conveyor-B section 134 unless drive motor D3 is energized.

The drive motor D9 for conveyor-H section 166 is energized with selector switch SS being placed in the SS 1 position. Additionally, when selector switch SS is placed in the SS 1 position an air relay is deenergized and the discharge section 150 pivots or lowers to discharge a mattress to conveyor-H section 166. The drive motor D10 for conveyor-I section 162 is energized with selector switch SS placed in position SS 2. Additionally, a second air relay is denenergized and discharge conveyor 150 lowers to discharge a mattress on conveyor-I section 162.

Other control systems may be used to attain individually controllable zones, such as can be accomplished through a computer controlled system. Additionally, electric eyes or other detection device may be used.

Extendable Conveyor

FIGS. 3–5 show the extendable mattress conveyor 10. Typically the extendable conveyor 10 has an extendable boom 20, a belt 30, and adjustable supports 40. Additionally, at the discharge end 22 of boom 20 are controls 50. Belt 30 runs over extendable boom 20. Preferably for moving mattresses the belt is a type "anchor rough two" which will provide sufficient friction and holding power to convey a mattress wrapped in plastic.

The extendable boom 20 has a fixed section 24 and extendable sections 26. Typically the extendable sections 26 are housed within the fixed section 24 when the extendable boom 20 is completely retracted. The discharge end of the fixed section 24 has two adjustable legs 40. One leg 40 is located on each side of the fixed section 24. Preferably these legs are located on either side of the conveyor and have attachment points proximate the top of the fixed section 24. This attachment point permits the use of sufficiently long adjustable legs 40 such that the discharge end 22 of the extendable conveyor 10 can be raised up to the roof of a truck, even when the conveyor is retracted to load cargo at the rear of the truck. Additionally, the use of long legs 40 permit the discharge end 22 adjustable conveyor 10 to be lowered as close as possible to the bed of the truck into which the mattresses are being loaded width wise.

To enable an operator to control both the rate of speed, height, and length of extendable conveyor 24 there is a control box located proximate the discharge end 22. Preferably there are two control boxes 50 one located on either side of discharge end 22. The use of two control boxes enables the connector cable from the control box to the conveyor to be sufficiently short such that the control box will not drag on the floor or bed of a truck and yet sufficiently long that an operator can easily operate the extendable conveyor.

Preferably a mattress is loaded into a truck or container using the conveyor 10 by vertically positioning the discharge end 22 of the extendable conveyor 22 above the truck floor or the surface onto which the mattress or package is to be placed. The optimum height will depend on the goods being loaded. The preferred height for a mattress is between approximately four to twenty inches. Typically, the discharge end 22 of the extendable conveyor 22 is horizontally placed so that the discharge end 22 of the extendable conveyor 22 clears the mattress or package when the mattress or package is in its final shipping location. Using this placement of the extendable conveyor 10 a mattress or other item may be loaded anywhere in the truck or container without the operator having to lift or handle the mattress or package. In some situations, however, the operator may need to position the mattress or other item from side to side, depending on the size of the item being loaded.

In summary, numerous benefits have been described that result from employing the concepts of the invention. The foregoing description of the invention has been presented for the purpose of illustration and description. It is not intended to be exhaustive or to limit the invention of the precise form disclosed. Obvious modifications or variations are possible in light of the above teachings. These embodiments were chosen and described in order to best illustrate the principals of the invention and its principle application to thereby enable one of ordinary skill in the art to best utilize the invention and various embodiments with various modifications as are suited to the particular use contemplated. It is intended that the scope of the invention be defined by the claims appended hereto.

What is claimed is:

1. A circulating conveyor system comprising:
  (a) a plurality of conveyor sections arranged in a closed path, each conveyor section having a first end and a discharge end and being configured to convey objects in a respective downstream direction toward said discharge end, adjacent conveyor sections comprising respective pairs of conveyor sections, each pair of adjacent conveyor sections comprising an upstream conveyor section and a downstream conveyor section, the downstream conveyor being disposed adjacent the discharge end of the upstream conveyor so as to receive the objects from said upstream conveyor, each respective conveyor section including a respective driven belt movably supported by said respective conveyor, said driven belt configured to contact the object when the respective objects are on said respective conveyor section, thereby conveying the objects toward the respective discharge end;
  (b) at least one of said pairs comprising a direction changing pair, each direction changing pair having the direction of travel of its upstream conveyor disposed at an angle to the direction of travel of its downstream conveyor such that the objects being conveyed change directions upon being transferred to said downstream conveyor; and
  (c) the discharge end of the respective upstream conveyor of said at least one direction changing pair being elevated a predetermined height above the respective downstream conveyor, the respective driven belt of said respective downstream conveyor being position on said downstream conveyor such that said object does not contact said driven belt sufficiently enough to convey said object until substantially all of said respective object is on said downstream conveyor, whereby the object's direction of travel is changed without changing the object's orientation.

2. The circulating conveyor system of claim 1, wherein one of said pairs of adjacent conveyor sections comprises an insert pair of conveyor sections, and further comprising a gap disposed between the upstream conveyor and the downstream conveyor of said insert pair of conveyors, said gap being configured to allow the objects to pass therethrough.

3. The circulating conveyor system of claims 2, wherein said gap is formed by the discharge end of said upstream conveyor of said insert pair of conveyors being elevated relative to the downstream conveyor of said insert pair of conveyors.

4. The circulating conveyor system of claim 3, further comprising an insert conveyor section having a discharge end disposed adjacent the first end of said downstream conveyor of said insert pair of conveyors.

5. The circulating conveyor system of claim 4, where said insert conveyor is disposed under said upstream conveyor of said insert pair of conveyors.

6. The circulating conveyor system of claim 5, wherein one of said pairs of adjacent conveyors comprises a discharge pair of conveyors, the upstream conveyor section of said discharge pair comprising a discharge conveyor section which is selectively moveable from a first position at which said discharge end of said discharge conveyor section is adjacent the downstream conveyor of said discharge pair to a second position at which objects are discharged from said circulating conveyor system.

7. The circulating conveyor system of claim 1, wherein one of said pairs of adjacent conveyors comprises a discharge pair of conveyors, the upstream conveyor section of said discharge pair comprising a discharge conveyor section which is selectively moveable from a first position at which said discharge end of said discharge conveyor section is adjacent the downstream conveyor of said discharge pair to a second position at which objects are discharged from said circulating conveyor system.

8. The circulating conveyor system of claim 1, further comprising a control system, said control system comprising each of said plurality of conveyor sections include a respective conveyor drive motor and a respective switch disposed adjacent the respective discharge end, each respective switch configured to detect the presence of a respective one of said objects, each of said respective conveyor sections having a respective sealing contact configured to detect whether the respective conveyor drive motor is running.

9. The circulating conveyor system of claim 8, wherein said control system further comprises the respective conveyor drive motor of a plurality of respective of conveyor sections being driven if the respective switch of said respective said of a conveyor section does not detect the presence of the object or if the respective sealing contact of the respective downstream conveyor section detects that the respective conveyor drive motor of the respective downstream conveyor section is being driven.

10. A control system for a closed path conveyor system, said conveyor system having a plurality of conveyor zones, adjacent conveyor zones comprising respective pairs of conveyor zones, each pair of adjacent conveyor zones comprising an upstream conveyor zone and a downstream conveyor zone, each conveyor zone having a respective first end and a respective discharge end, a plurality of said conveyor zones having respective conveyor drive motors, said control system comprising:

each of said plurality of conveyor zones having a respective switch disposed adjacent the respective discharge end, each respective switch being configured to detect the presence of an object, each of said respective conveyor zones having a respective sealing contact configured to detect whether the respective conveyor drive motor of said respective conveyor zone is running, and the respective conveyor drive motor of a plurality of respective conveyor zones being driven if the respective switch of said respective conveyor zone does not detect the presence of an object or if the respective sealing contact of the respective downstream conveyor zone detects that the respective conveyor drive motor of the respective downstream conveyor zone is being driven.

11. The control system of claim 10, wherein one of said pairs of adjacent conveyor zones comprises an insert pair of conveyor zones comprising an upstream conveyor zone and a downstream conveyor zone, each conveyor zone having a respective first end, a respective discharge end, and a respective conveyor drive motor, said closed path conveyor system further comprising a gap disposed between the upstream conveyor zone and the downstream conveyor zone of said insert pair, said closed path conveyor system further comprising an insert conveyor zone having a conveyor drive and a discharge end disposed adjacent the first end of the downstream conveyor zone of said insert pair, said gap being configured to allow objects to pass from said insert conveyor zone therethrough, the conveyor drive motor of said upstream conveyor zone of said insert pair being driven if the respective switch of said upstream conveyor zone of said insert pair detects the presence of an object or if said conveyor drive of said insert zone is stopped.

* * * * *